(12) United States Patent
Wong et al.

(10) Patent No.: US 7,534,097 B2
(45) Date of Patent: May 19, 2009

(54) METHOD AND APPARATUS FOR CONTROLLING MULTI-FLUID FLOW IN A MICRO CHANNEL

(75) Inventors: Teck Neng Wong, Singapore (SG); Nam Trung Nguyen, Singapore (SG); Chun Yang, Singapore (SG); Chee Kiong John Chai, Singapore (SG); Kim Tiow Ooi, Singapore (SG); Cheng Wang, Singapore (SG); Yan Dong Gao, Singapore (SG)

(73) Assignee: Nanyang Technological University, Singapore (SG)

( * ) Notice: Subject to any disclaimer, the term of this patent is extended or adjusted under 35 U.S.C. 154(b) by 438 days.

(21) Appl. No.: 11/250,752

(22) Filed: Oct. 14, 2005

(65) Prior Publication Data
US 2006/0093488 A1 May 4, 2006

Related U.S. Application Data

(60) Provisional application No. 60/618,603, filed on Oct. 15, 2004.

(51) Int. Cl.
*F04F 5/46* (2006.01)
(52) U.S. Cl. .................... 417/54; 417/48; 137/806; 137/827

(58) Field of Classification Search ............ 417/48, 417/53, 54; 422/81, 82, 100; 137/806, 827
See application file for complete search history.

(56) References Cited

U.S. PATENT DOCUMENTS

| 5,858,195 | A * | 1/1999 | Ramsey ................. 204/601 |
| 6,342,142 | B1 * | 1/2002 | Ramsey ................. 204/453 |
| 6,432,630 | B1 * | 8/2002 | Blankenstein ............ 435/4 |
| 7,316,543 | B2 * | 1/2008 | Goodson et al. .......... 417/50 |
| 2003/0159999 | A1 * | 8/2003 | Oakey et al. ............ 210/695 |
| 2004/0094220 | A1 * | 5/2004 | Barholm-Hansen ....... 137/834 |
| 2005/0113912 | A1 * | 5/2005 | Feenstra et al. ......... 623/6.13 |

* cited by examiner

*Primary Examiner*—Devon C Kramer
*Assistant Examiner*—Dnyanesh Kasture
(74) *Attorney, Agent, or Firm*—Blakely, Sokoloff, Taylor & Zafman LLP (57) ABSTRACT

A method and apparatus for controlling multi-fluid flow in a micro channel is disclosed. The apparatus has a first inlet for a first fluid; a second inlet for a second fluid; a first outlet; and a second outlet. The micro channel is operatively and fluidically connected to the first inlet, the second inlet, the first outlet and the second outlet. The micro channel is for receiving the first fluid and the second fluid under pressure-driven flow; there being an interface between the first fluid and the second fluid when in the micro channel. The apparatus also includes a pair of electrodes for having a first electric field applied thereto for a controlling the fluid flow velocity of the first fluid along the micro channel.

66 Claims, 9 Drawing Sheets

METHOD AND APPARATUS FOR CONTROLLING MULTI-FLUID FLOW IN A MICRO CHANNEL

CROSS-REFERENCE TO RELATED APPLICATIONS

This application claims priority from U.S. Provisional Patent Application No. 60/618,603 filed Oct. 15, 2004, which is hereby incorporated herein in its entirety for all purposes.

FIELD OF THE INVENTION

This invention relates to a method and apparatus for controlling multi-fluid flow in a micro channel and refers particularly, though not exclusively, to such a method and apparatus that operates on electrokinetic and hydrodynamic principles. In a preferred aspect the present invention relates to a method and apparatus for controlling a position of an interface of fluids in the micro channel for switching, mixing and/or cytometering. In a more preferred aspect the present invention is also for controlling the form and position of the interface.

BACKGROUND OF THE INVENTION

Most solid surfaces acquire an electrostatic charge when in contact with polar liquids. As a result, a difference in potential is developed across the interface between the negative and positive phases. The charged interface attracts ions of opposition charge (counter-ions) and repels ions of like charge (co-ions) in the liquid. The arrangement of charges that occurs near the interface leads to the development of an electric double layer. When a tangential electric field is applied along the capillary along which the liquid flows, liquids are pumped due to electroosmostic flow. The two widely used methods for the transportation of a single fluid in microfluidics are electroosmostic flow, and pressurized flow.

In microfluidics, the Reynolds number is small and fluid flow is laminar. Laminar fluid diffusion interfaces are created when two or more streams flow in parallel within a single micro-structure. Since the flows are laminar, there is no mixing between them. No mixing may be very useful because only diffusion occurs between the different streams of flow. Therefore, it is able to be used for extraction or separation in biological analysis. Diffusion-based microfluidic devices, such as the T-sensor® and the H-filter® have been developed for commercial use by Micronics, Inc. of Redmond, Wash., USA.

The variable viscosity of biological fluids can be problematic when the two streams of flows have different viscosities. The fluid with higher viscosity will occupy a wider portion of the channel while having a smaller velocity; whereas the fluid with lower viscosity flows at a larger velocity within a narrow portion of the channel. The two fluids will still have the same volumetric flow rate. The unmatched viscosity affects diffusion due to differences in residence time. The average residence time of the more viscous fluid will increase, while that of the less viscous fluid will decrease. To overcome this problem, it has been proposed to measure the viscosity of the fluid, and to add a viscosity-enhancing solute to the less viscous fluid. Another proposal is to control the ratio of the volumetric flow rate of the two fluids. By increasing the flow rate of the less viscous fluid, it is possible to maintain the interface of the two streams at the center of the channel. However, the unmatched average residence time remains unsolved because the less viscous fluid flows even faster, and has even shorter average residence time within the channel.

SUMMARY OF THE INVENTION

In accordance with a first preferred aspect there is provided an apparatus for controlling fluid flow in a micro channel, the apparatus comprising:
  a first inlet for a first fluid;
  a second inlet for a second fluid;
  a first outlet;
  a second outlet;
  a pair of electrodes; and
  the micro channel, wherein the micro channel is operatively and fluidically connected to the first inlet, the second inlet, the first outlet and the second outlet, the micro channel receives the first fluid and the second fluid under pressurized flow, a first interface is between the first fluid and the second fluid in the micro channel, and the pair of electrodes apply a first electric field that controls a flow velocity of the first fluid along the micro channel.

According to a second aspect there is provided a method for controlling fluid flow in a micro channel, wherein the micro channel is operatively and fluidically connected to a first inlet, a second inlet, a first outlet and a second outlet, the method comprising:
  supplying a first fluid through the first inlet under pressurized flow to the micro channel;
  supplying a second fluid through the second inlet under pressurized flow to the micro channel;
  flowing the first fluid along the micro channel to the first outlet;
  flowing the second fluid along the micro channel to the second outlet;
  providing a first interface between the first fluid and the second fluid in the micro channel; and
  applying a first electric field using a pair of electrodes to control a flow velocity of the first fluid along the micro channel.

The first electric field may control a location of the first interface across a width of the micro channel, and a residence time of the first and second fluids in the micro channel.

The first pair of electrodes may comprise a first electrode and a second electrode, wherein the first electrode is in the first inlet and the second electrode is in the first outlet.

The apparatus may comprise a third inlet for a third fluid, wherein the second inlet is between and spaced from the first inlet and the third inlet, a second interface is between the second fluid and the third fluid, and the third inlet and the third outlet are operatively and fluidically connected to the micro channel.

The apparatus may comprise a second pair of electrodes that apply a second electric field that controls a velocity of the third fluid along the micro channel. The second electric field may also control a location of the second interface across the width of the micro channel, and a residence time of the first, second and third fluids in the micro channel. The second pair of electrodes may comprise a first electrode and a second electrode, wherein the first electrode is in the third inlet and the second electrode is in the third outlet.

The apparatus may comprise a fourth outlet operatively and fluidically connected to the micro channel. The second electrode of the second pair of electrodes may be in the fourth outlet.

The apparatus may comprise a fifth outlet operatively and fluidically connected to the micro channel. The second electrode of the second pair of electrodes may be in the fifth outlet.

The first electric field and the second electric field may direct the second fluid to at least one of the first outlet, the second outlet, the third outlet, the fourth outlet and the fifth outlet.

The apparatus may be and the method may be used for at least one of an electrokinetic flow switch, a micromixer, a micro-flow cytometer, an interface position controller, and an in-channel fluidic lens.

The apparatus may include a fourth inlet for a fourth fluid that is operatively and fluidically connected to the micro channel. The fourth inlet may be between and spaced from the second and third inlets. Alternatively, the apparatus may include top and bottom fourth inlets, wherein the top fourth inlet is between and spaced from the first inlet and the second inlet, and the bottom fourth inlet is between and spaced from the second inlet and the third inlet. The fourth fluid may be a protection fluid that separates the first fluid from the second and third fluids. Alternatively, the fourth fluid may be two sample fluids and the second fluid may be a protection fluid that separates the two sample fluids.

The first and second electric fields may narrow a width of the second fluid in the micro channel, thereby focusing a flow of the second fluid in the micro channel. The apparatus may be a micro-mixer, and the method may be used for mixing at the micro scale, and the first and second electric fields may narrow a width of the second and fourth fluids in the micro channel, thereby controlling a diffusion path and a diffusion time in the micro channel.

The apparatus may include a controller for controlling the first electric field and the second electric field, and the first electric field and the second electric field may control the locations of the first interface and the second interface.

The apparatus may include a pair of additional electrodes located at opposite axial ends of the micro channel, and a pair of further electrodes located at a top and a bottom of the micro channel, wherein the further electrodes control a curved shape of the first interface, and the additional electrodes control a focal length and a position of the curved shape.

BRIEF DESCRIPTION OF THE DRAWINGS

In order that the present invention may be fully understood and readily put into practical effect, there shall now be described by way of non-limitative example only preferred embodiments of the present invention, the description being with reference to the accompanying illustrative drawings.

In the drawings.

DETAILED DESCRIPTION OF THE PREFERRED EMBODIMENTS

Figure 1:
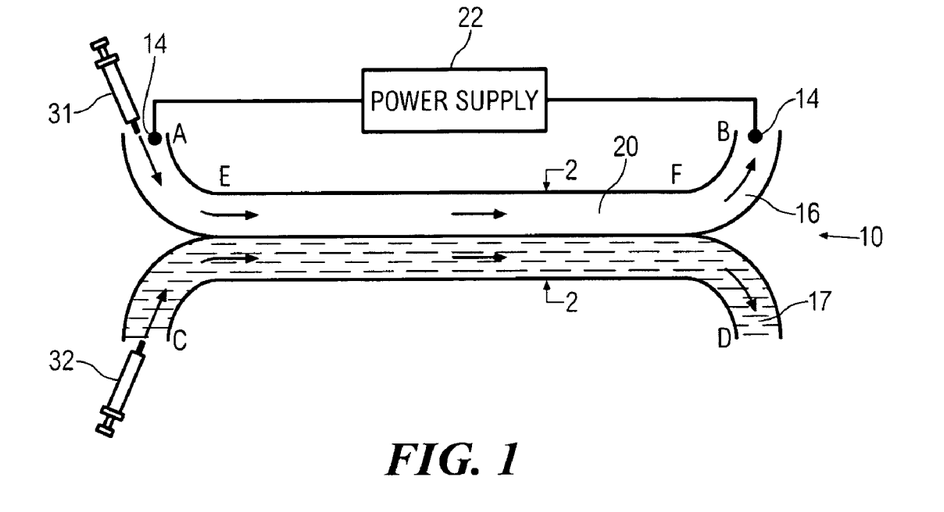
FIG. 1 is a schematic top view of a preferred micro channel arrangement.
Figure 2:
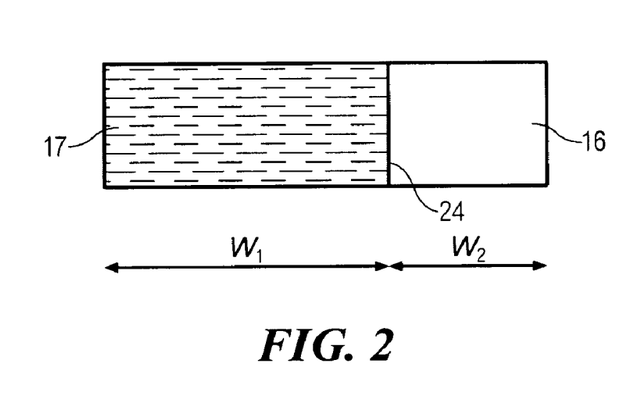
FIG. 2 is an enlarged vertical cross-sectional view along the lines and in the direction of arrows 2-2 in FIG. 1.

The first embodiment is shown in FIGS. 1 and 2 and includes H-shaped microfluidics structure 10, syringes 31, 32 driven by pumps (not shown), and electrodes 14 for the application of an electric field. Preferably electrodes 14 are a metal such as platinum. Syringes 31, 32 supply fluids 16, 17 respectively to straight micro channel 20, and fluids 16, 17 flow side-by-side in micro channel 20 from left to right. Fluids 16, 17 flow under the action of pressure from syringes 31, 32 respectively. Inlets A and C are for fluids 16, 17 respectively, and outlets B and D are for the collection of products or wastes from micro channel 20. Between inlet A and outlet B, electrodes 14 are inserted for the application of the electric field and electrodes 14 are supplied by power supply 22. The electric field from inlet A to outlet B is positive, and from outlet B to inlet A is negative. Micro channel 20 may have any suitable size and configuration such as a cross sectional area of 1000 μm×100 μm and a length of 5 mm. This gives micro channel 20 a width to depth ratio of 10:1.

Fluids 16, 17 are introduced through inlets A and C respectively into micro channel 20. The schematic cross-sectional view of fluids 16, 17 flow inside micro channel 20 is shown in FIG. 2. Interface 24 is between fluids 16, 17. Fluid 16 may be an aqueous NaCl solution (concentration $0.7 \times 10^{-3}$M) and the fluid 17 may be an aqueous glycerol (volume concentration 14%). The widths occupied by NaCl solution 16 and aqueous glycerol 17 are denoted as $w_2$ and $w_1$ respectively. The holdup of NaCl solution 16, $e_2$, is the ratio of the area occupied by NaCl solution 16 to the whole area of the cross-section of micro channel 20. As the height is common, this becomes:

$$e_2 = \frac{w_2}{w_1 + w_2}.$$

Similarly, the holdup of aqueous glycerol 17 is $e_1 = 1 - e_2$.

When fluids 16, 17 contact the channel wall of micro channel 20, the negatively charged channel wall influences the distribution of free ions in NaCl solution 16 to form an electrical double layer near the channel wall. But aqueous glycerol 17 only minimally forms an electrical double layer as there are few free ions. Thus the electroosmotic flow will only affect NaCl solution 16. When a positive voltage is applied between inlet A and outlet B (inlet A at the positive electrode 14, outlet B at the negative electrode 14), the electroosmotic force forces NaCl solution 16 to flow in the same direction as the pressurized flow. If a negative electric field is applied (inlet A is at the negative electrode 14, outlet B is at the positive electrode 14), an opposite electroosmotic flow results which is against the pressurized flow.

A fluorescent dye such as fluorescein disodium salt $C_{20}H_{10}Na_2O_5$, (also called Acid Yellow 73) may be added to NaCl solution 16 for image collection. When the fluorescein is illuminated by a mercury lamp, a coupled charge device (CCD) camera or other similar device may be used for image capturing to enable measurements to be taken. The same volumetric flow rates at inlets A and C may be ensured through the use of identical syringes 31, 32 driven by a single syringe pump.

Figure 3A:
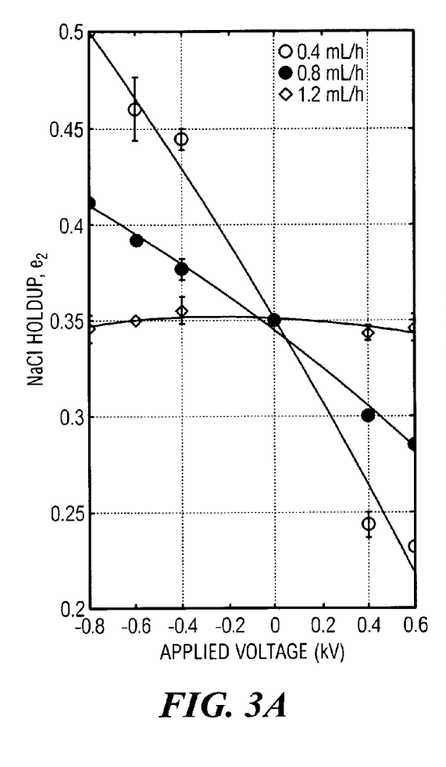
FIG. 3 is two graphs of the relationship between NaCl holdup and (a) different applied voltage for the same volumetric flow rates, and (b) volumetric flow rate under the same applied voltage.

The parameters considered in the graphs of FIG. 3 are inlet volumetric flow rates, and electric voltage applied between inlet A and outlet B. The holdup of NaCl solution 16 was obtained by normalizing its width $w_2$ to the whole channel width $(w_2+w_1)$ of micro channel 20. As shown in FIG. 3(a), when the electric field changes in magnitude and direction, the holdup of NaCl solution 16 changes accordingly. When no voltage is applied across inlet A and outlet B, the flow is simply a pressurized two-phase flow. As aqueous glycerol 17 is about 1.5 times more viscous than NaCl solution 16, the less viscous NaCl solution 16 occupies a smaller portion of the channel width of micro channel 20. NaCl solution 16 has a holdup of 0.35 without an externally applied voltage, as shown in FIG. 3(a). When a negative electric field is applied across inlet A and outlet B, the holdup of NaCl solution 16 increases as the electroosmotic flow is against the pressurized flow by the use of the negative electric field. One explanation is that NaCl solution 16 becomes more "viscous" due to the electroosmotic effect. As such it occupies a larger proportion of the channel width of micro channel 20—$w_2$ increases and $w_1$ decreases. The holdup of NaCl solution 16 increases with an increase in the negative electric field.

Due to the same pressure drop across sections E and F of micro channel 20 (see FIG. 1), in order to achieve the same volumetric flow rates, the more viscous fluid has to spread to a larger width, i.e. a higher liquid holdup. When a positive electric field is applied, NaCl solution 16 has a lower "viscosity" since the electroosmotic flow is the same direction as the pressurized flow so that the electroosmotic effect aids the flow of NaCl solution 16.

FIG. 3(a) also shows that as the inlet volumetric flow rates of fluids 16, 17 increase, the electroosmotic flow effect on the pressurized flow weakens. At the flow rate of 1.2 ml/h, the holdup of NaCl solution 16, $e_2$, remains constant even though the voltage varies from −0.8 kV to 0.6 kV. For typical electroosmotic flows, in which hundreds of volts per centimeter of electric field are applied, the resultant flow rate is of the order 0.1 to a few mm/s. But for pressurized flow in micro channels, the flow rate can be controlled over a wider range. When the pressurized flow rate is set at 0.4 ml/h, the average velocity for NaCl solution 16 through micro channel 20 is 3.17 mm/s with no external applied electric field. This is comparable to that of electroosmotic flow. FIG. 3(a) shows that by adjusting the electric field, the position of interface 24 between fluids 16, 17 can be controlled. As such, variation of NaCl solution 16 holdup $e_2$ from 0.25 to 0.50 is controlled.

Figure 3B:
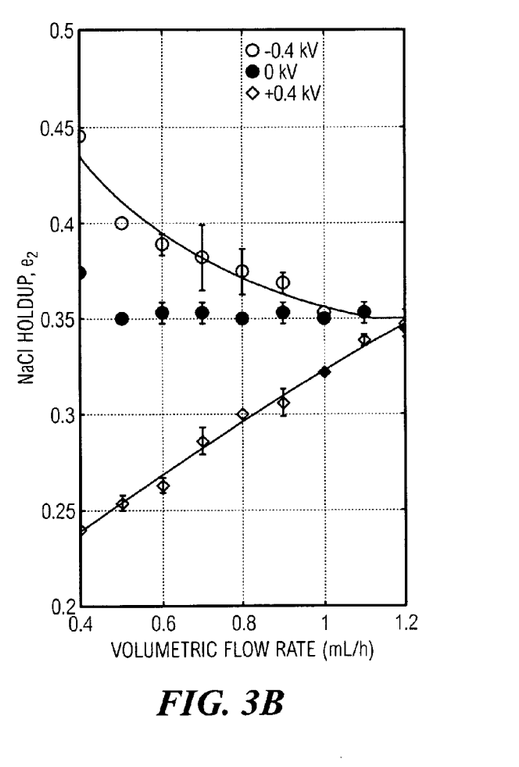

The relationship between NaCl solution 16 holdup $e_2$ at different flow rates under a fixed electric field is shown in FIG. 3(b). Holdup $e_2$ remains the same (0.35) for different volumetric flow rates in the absence of an externally applied electric field. This is because the volumetric flow rates ratio between fluids 16, 17 is kept unchanged at 1:1. As the flow rate increases, holdup $e_2$ converges to a constant value, 0.35. This is the value without an externally applied electric field. The reason is that the larger, pressurized flow speed makes the electroosmotic effect virtually negligible.

Therefore, by adjusting the magnitude and the direction of the applied electric field, the position of interface 24 between fluids 16, 17 can be controlled, as can be the average residence time for fluids 16, 17. The H-shaped microfluidics structure 10 can therefore be used as a diffusion-based analysis device as it provides the same average residence time for fluids 16, 17.

Figure 4:
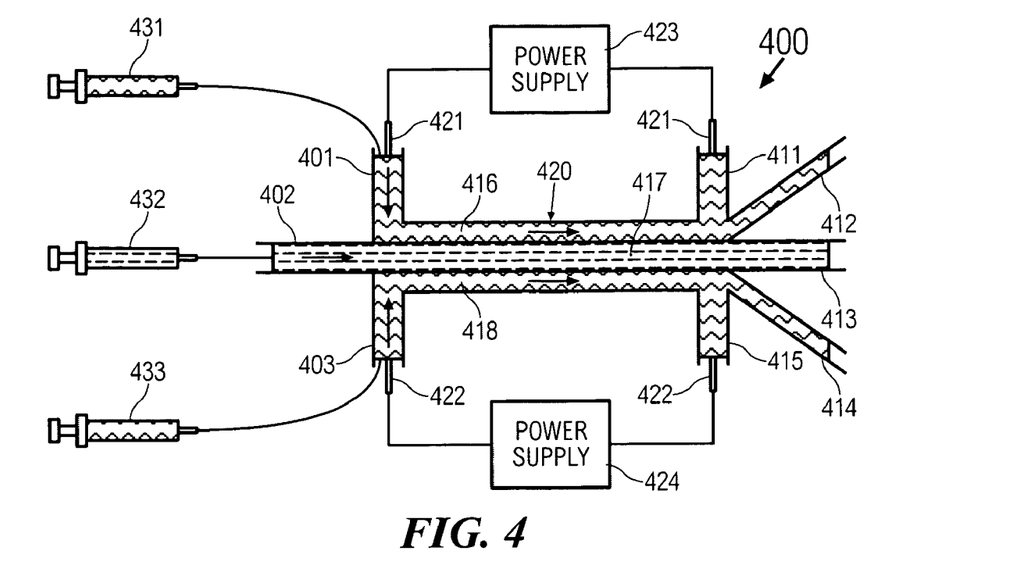
FIG. 4 is a schematic illustration of a second preferred form of flow switch at a first operational state.

A second preferred from of microfluidic flow switch is shown in FIG. 4. Microfluidics device 400 has three inlets 401, 402 and 403 with respective syringes 431, 432 and 433, and five outlets 411 to 415. Inlets 401 and 403 are spaced apart and introduce control fluids 416 and 418 such as aqueous NaCl. Sample fluid 411, which can be a biological fluid of interest, is introduced from inlet 402 between and spaced from inlets 401, 403. A first pair of electrodes 421 is located between inlet 401 and outlet 411, and a second pair of electrodes 422 is located between inlet 403 and outlet 415 for the application of electric fields. Electrodes 421 are supplied by first power supply 423, and electrodes 422 are supplied by second power supply 424.

Without changing the flow rate, the spread widths of the three laminar streams of fluids 416, 417 and 418 can be adjusted by adjusting the direction and strength of the electric field, based on the working principle described above. Sample fluid 417 can therefore be guided into different outlets by controlling the direction and strength of the voltage applied to electrodes 421 and 422.

In FIG. 4, electrodes 421 and 422 apply equal electric fields so that fluids 416 and 418 occupy an equal portion of the channel width of micro channel 420. In that way, sample fluid 417 is guided down the centre of micro channel 420 and thus exits through the centrally-aligned outlet 413.

Figure 5:
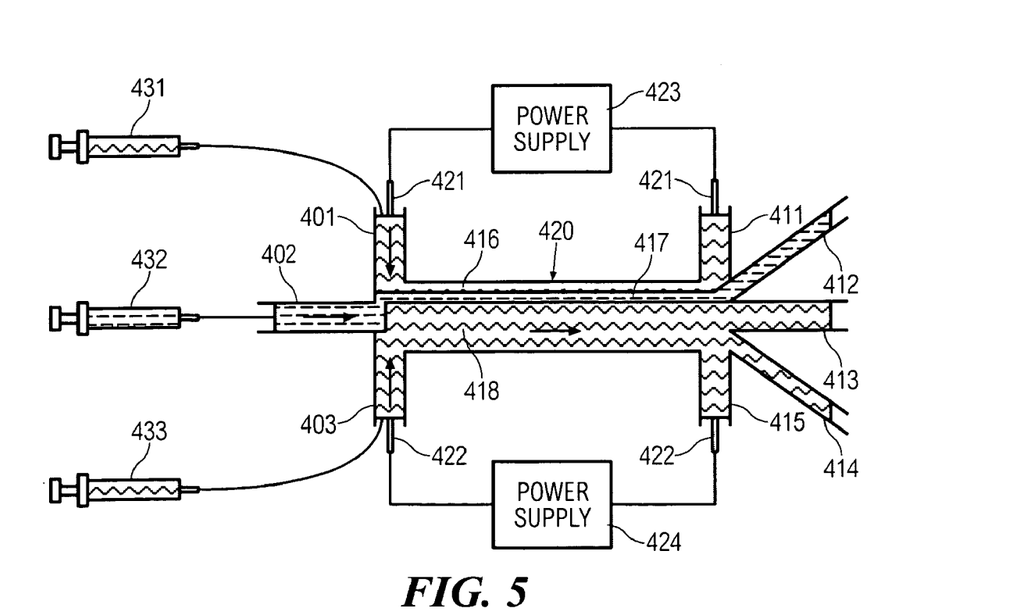
FIG. 5 is a schematic illustration of the second preferred form of flow switch at a second operational state.

In FIG. 5, if electrodes 421 apply a positive electric field and electrodes 422 apply a negative electric field, control fluid 416 occupies a reduced portion of the channel width of micro channel 420, and control fluid 418 occupies an increased portion of the channel width of micro channel 420, thereby guiding sample fluid 417 to outlet 412. A similar effect may be achieved by having electrodes 421 apply a strong, positive electric field and electrodes 422 apply no electric field. The effect is created by having electrodes 421 apply an electric field that is more positive than that applied by electrodes 422.

Figure 6:
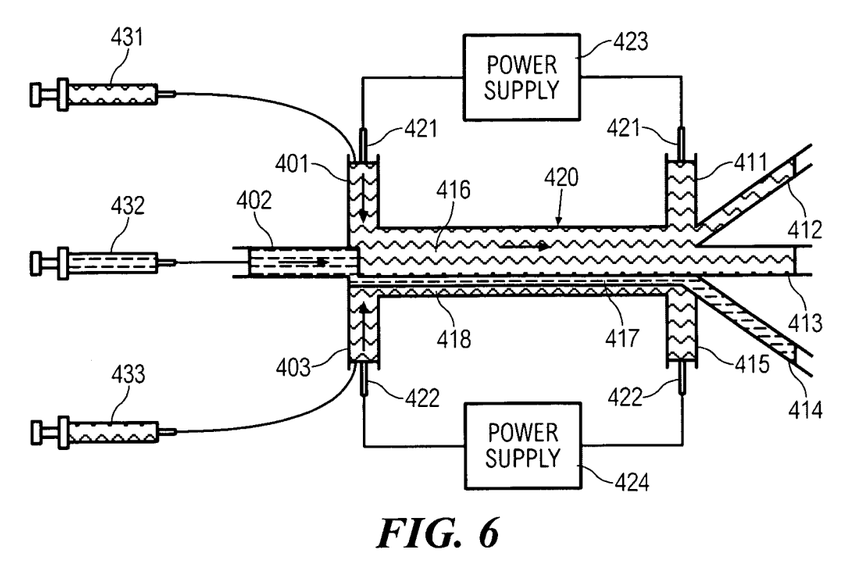
FIG. 6 is a schematic illustration of the second preferred form of flow switch at a third operational state.
Figure 7:
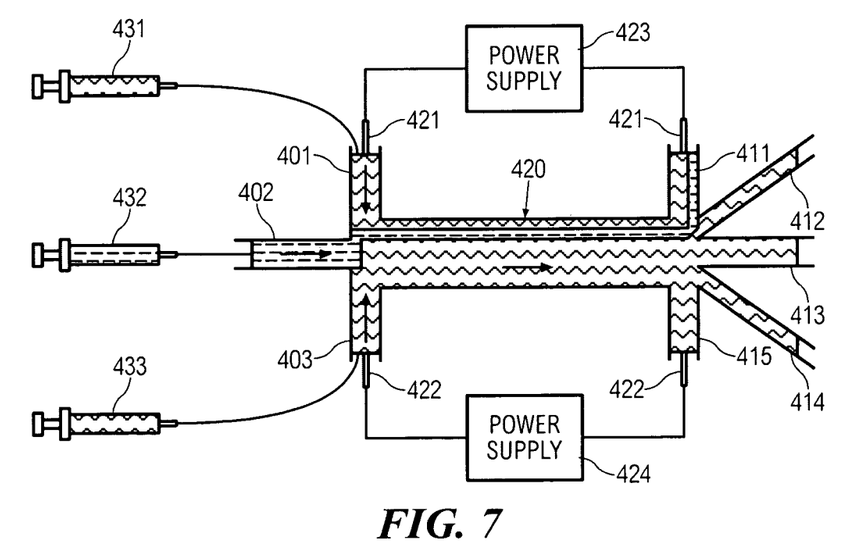
FIG. 7 is a schematic illustration of the second preferred form of flow switch at a fourth operational state.

FIG. 6 is the reverse of FIG. 5, so that sample fluid 417 flows to outlet 414, and FIG. 7 is the same as FIG. 5 except that the difference in the applied electric fields is greater so that sample fluid 417 flows to outlet 411.

To get sample fluid 417 of high purity, the electric fields can be adjusted so that sample fluid 417 has a width that is slightly larger than the outlet width.

Figure 8:
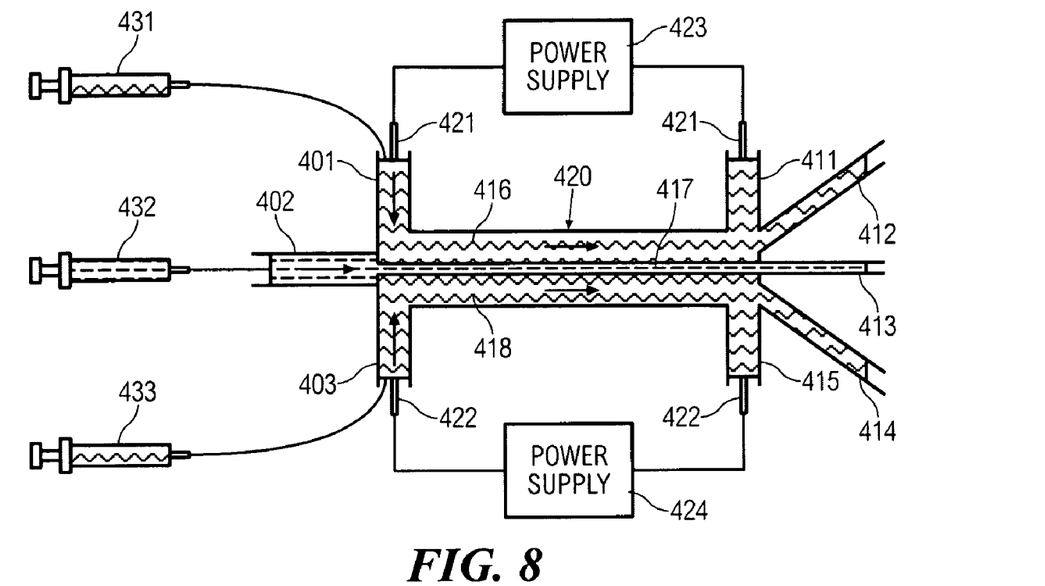
FIG. 8 is a schematic illustration of the second preferred form of flow switch at a fifth operational state.

Besides flow switching, microfluidics device 400 can be used for flow focusing. Sample fluid 417 can be squeezed into a very thin flow to allow only a single cell or several cells to pass as in FIG. 8. This is useful for cell detection. If the electric field is remotely controlled such as by using a computer, a programmable sample injection device or programmable dispensing device can be provided. Microfluidics device 400 can also be used as a valve since the desired outlet 411 to 415 can be selected by controlling the electric field.

Figure 9:
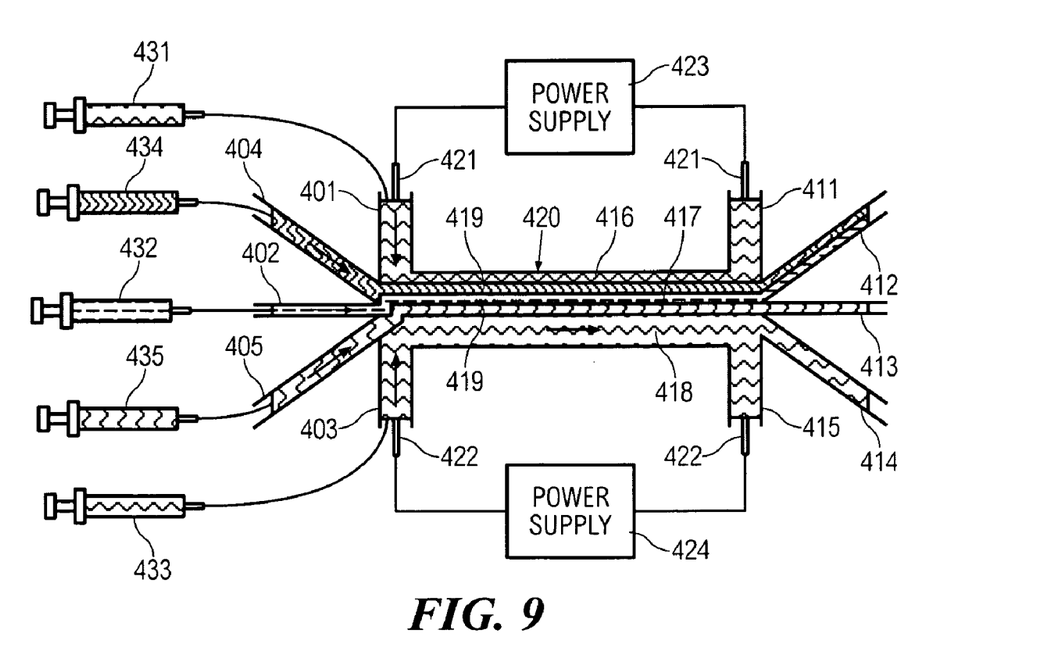
FIG. 9 is a schematic illustration of a third preferred form of flow switch at a first operational state.

To reduce diffusion or reaction between control fluids 416, 418 and sample fluid 417, another protection fluid 419 is introduced to separate the two in FIG. 9. Preferably, protection fluid 419 is relatively inert with both control fluids 416, 418 and sample fluid 417. Protection fluid 419 is introduced by syringes 434, 435 and respective inlets 404, 405.

Figure 10:
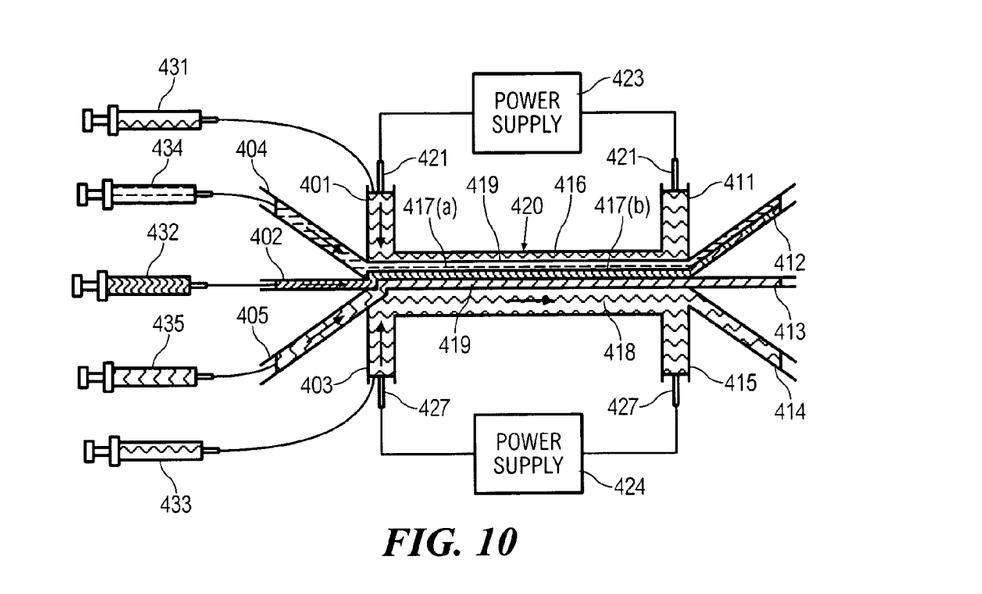
FIG. 10 is a schematic illustration of the third preferred form of flow switch at a second operational state.

Multiple sample fluids 417 are switched in FIG. 10. Between sample fluids 417(a) and 417(b), protection fluid 419 or a buffer fluid is introduced for separation of sample fluids 417(a) and 417(b).

Figure 11:
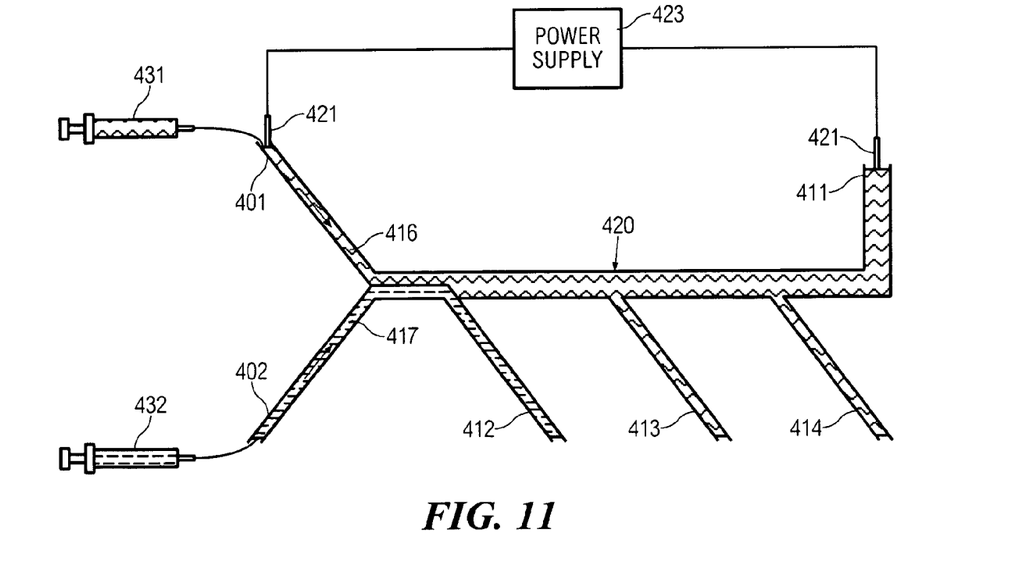
FIG. 11 is a schematic illustration of a fourth preferred form of flow switch at a first operational state.
Figure 12:
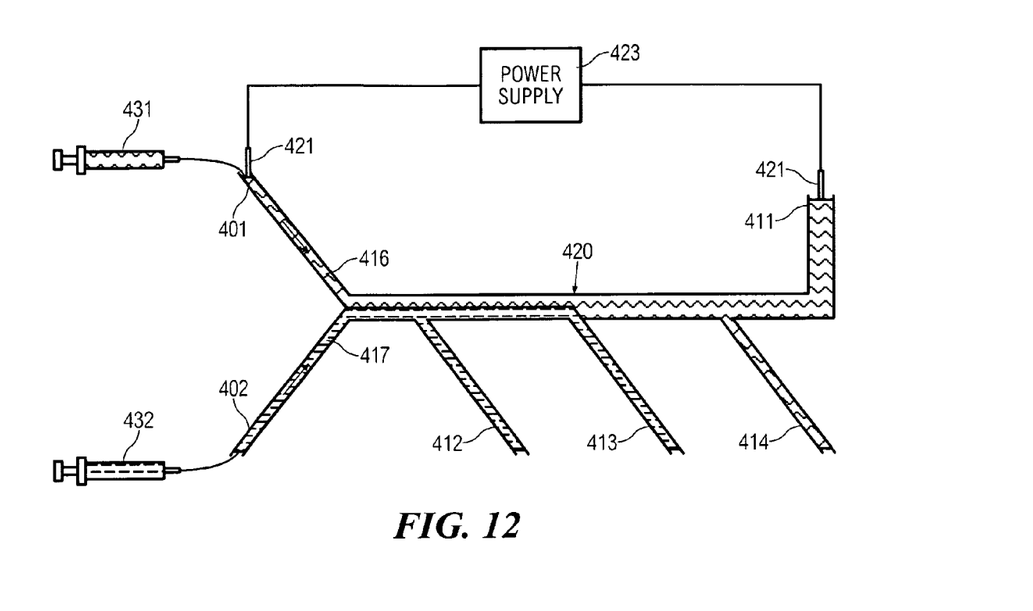
FIG. 12 is a schematic illustration of the fourth preferred form of flow switch at a second operational state.
Figure 13:
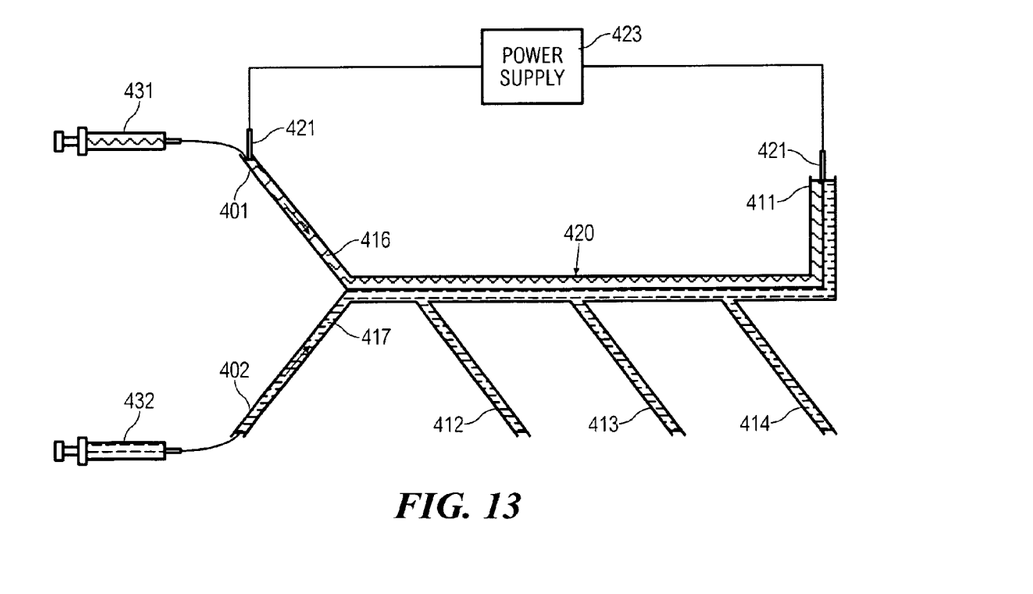
FIG. 13 is a schematic illustration of the fourth preferred form of flow switch at a third operational state.

Other designs based on the working principle of the present invention can be employed. FIGS. 11 to 13 show a Y-shaped flow switch under different work modes, e.g. switching sample fluid 417 to one or more outlets. In FIG. 11, the Y-shaped microfluidic flow switch has two inlets 401, 402 and four outlets 411 to 414. Control fluid 416 and sample fluid 417 are introduced from inlets 401 and 402. The electric field is applied through two electrodes 421 inserted between inlet 401 and outlet 411. Sample fluid 417 can be directed to outlets 412, 413 and 414. For example, the flow switch directs sample fluid 417 to outlet 412 as shown. In FIG. 12, sample fluid 417 is passed to outlets 412, 413, and in FIG. 13, sample fluid 417 is passed to outlets 411 to 414. This may be simultaneously, or sequentially.

Figure 14:
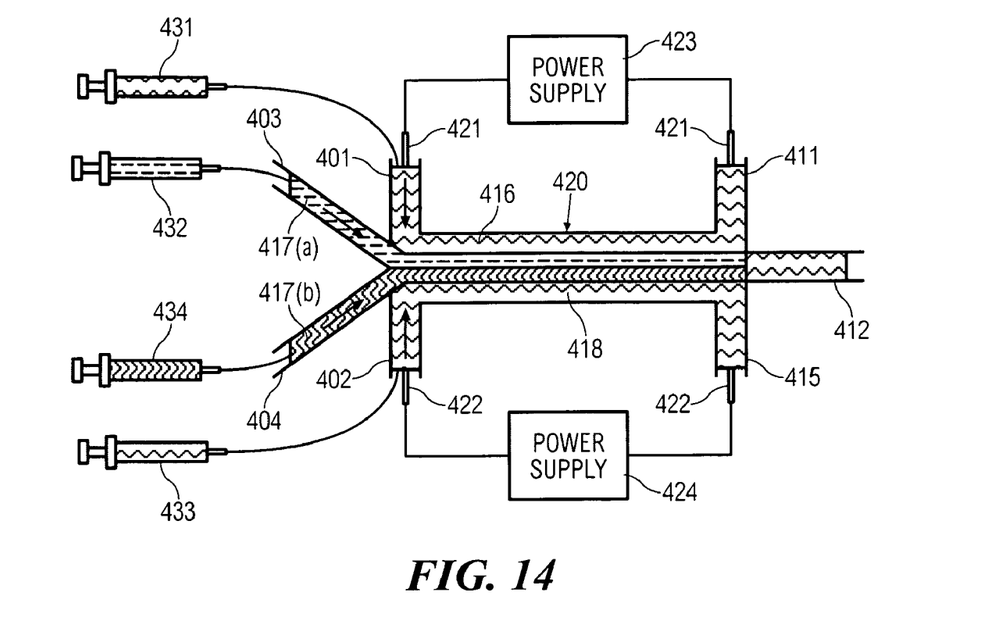
FIG. 14 is a schematic illustration of a micro mixer.

FIG. 14 shows microfluidics device 400 as a micro mixer. The diffusion distance, according to the square dependency, affects the diffusion time between the laminar flows of sample fluids 417(a) and 417(b). As diffusion is the main mechanism through which mixing occurs between the two laminar streams, by adjusting the electric field across the control fluids 416 and 418, sample fluids 417(a) and 417(b) are squeezed into a narrow stream to thus reduce the diffusion path and diffusion time and increase the mixing efficiency.

Figure 15:
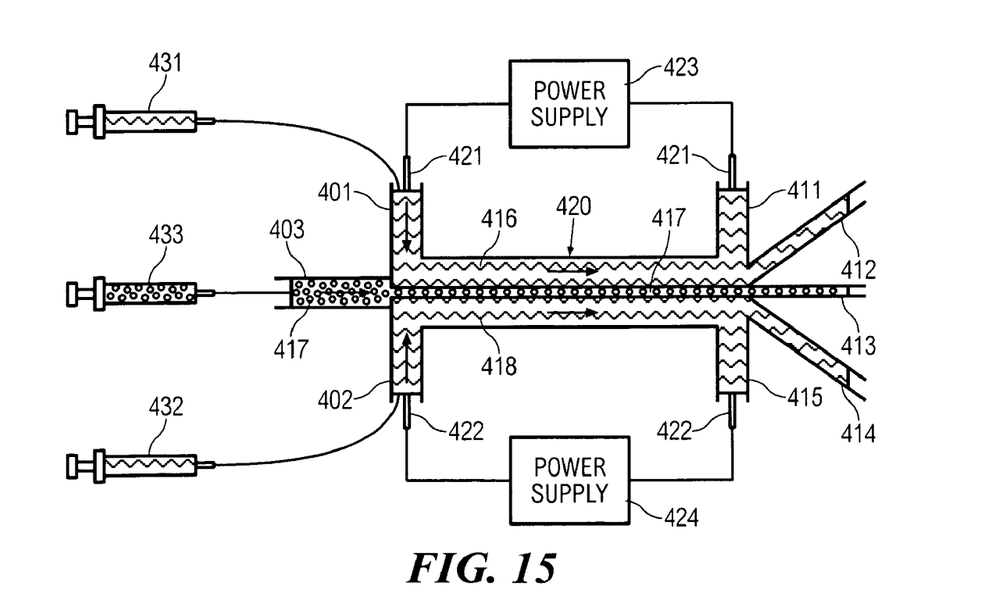
FIG. 15 is a schematic illustration of a microflow cytometer.

FIG. 15 shows microfluidics device 400 as a microflow cytometer. A conventional microflow cytometer uses hydrodynamic focusing. Instead of focusing the sample flow hydrodynamically through the sheath flow rate, by combining the pressure driven and the electrokinetic effects, microfluidics device 400 provides a microflow cytometer that focuses the cells in sample fluid 417. The fluid flow along micro channel 420 is smaller in width than inlet 403, and is preferably the same as, or only slightly greater than outlet 413. In this way the focusing takes place along micro channel 420.

Although the electrodes 14, 421 and 422 are described and illustrated as being in the inlets and outlets, they may be located in micro channel 20, 420 adjacent the inlets and outlets, or at the junction of the inlets and the micro channel, and/or at the junction of the outlets and the micro channel.

Figure 16:
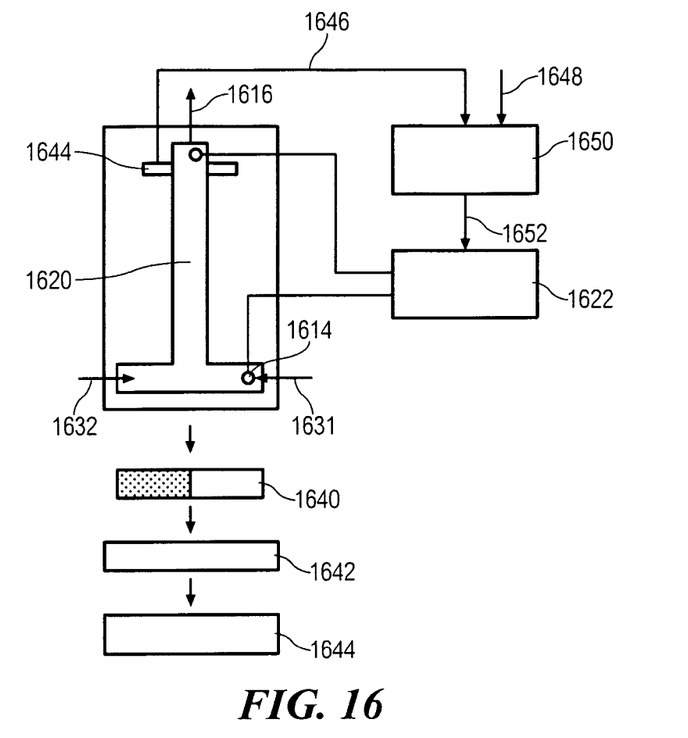
FIG. 16 is a schematic illustration of an interface position controller.

FIG. 16 illustrates an interface position controller for determining and controlling the positions of interfaces between fluids. When fluids in micro channel 1620 are excited with laser 1640, fluorescent light signals are emitted. Band-gap filter 1642 is placed on the other side of micro channel 1620 so that only light of the emitted wavelength is passed to CCD array 1644, or other photosensor. The fluorescent signal detects the presence of the fluid interfaces and thus enables the position of the fluid interfaces to be determined as the output signal 1646 is proportional to the bright area of micro channel 1620. The interface position is compared to the desired position 1648 in controller 1650, and if they are different, controller 1650 outputs control signal 1652 to amplifier 1622. The power supply to terminals 1614 is adjusted to adjust the applied electric field to micro channel 1620 thereby controlling the interface position.

Figure 17:
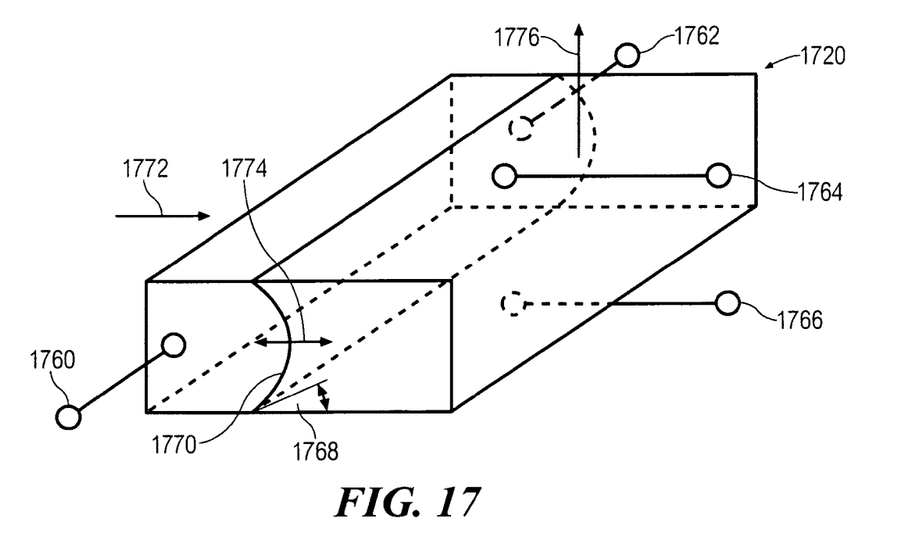
FIG. 17 is a schematic illustration of an in-channel fluidic lens.

FIG. 17 illustrates an in-channel fluidic lens. Additional electrodes 1760 and 1762 are located at opposite axial ends of micro channel 1720 and provide axial control, and two further electrodes 1764 and 1766 are placed at the top and bottom of micro channel 1720 at the detection area of micro channel 1720. The electrodes may be transparent material such as indium tin oxide. Further electrodes 1764 and 1766 apply a potential that, in turn, controls contact angle 1768. Therefore, interface 1770 becomes curved as shown. Interface 1770 acts as a cylindrical lens and focuses the incoming excitation laser 1772 to a sheet with high intensity. This allows for a large fluorescence detection area within micro channel 1720, and for emitted signal 1776 to have higher intensity. Focal length and position 1774 is controlled by the potential applied by additional electrodes 1760, 1762. Therefore, by selective excitation of electrodes 1760, 1762, 1764 and 1766, improved performance may result.

Whilst there has been described in the foregoing description preferred embodiments of the present invention, it will be understood by those skilled in the technology concerned that many variations or modifications in details of design or construction may be made without departing from the present invention.

What is claimed is:

1. An apparatus for controlling fluid flow in a micro channel, the apparatus comprising:
    a first inlet for a first fluid;
    a second inlet for a second fluid;
    a first outlet;
    a second outlet;
    a pair of electrodes; and
    the micro channel, wherein the micro channel is operatively and fluidically connected to the first inlet, the second inlet, the first outlet and the second outlet, the micro channel receives the first fluid and the second fluid under pressurized flow, a first interface is between the first fluid and the second fluid in the micro channel, and the pair of electrodes apply a first electric field that controls a flow velocity of the first fluid along the micro channel, a location of the first interface across a width of the micro channel, and a residence time of the first and second fluids in the micro channel.

2. The apparatus of claim 1, wherein the first electric field controls an electroosmotic force in the micro channel, and the electroosmotic force affects a flow of the first fluid in the micro channel.

3. The apparatus of claim 1, wherein the first pair of electrodes comprises a first electrode and a second electrode, the first electrode is in the first inlet and the second electrode is in the first outlet.

4. The apparatus of claim 1, further comprising:
    a third inlet for a third fluid; and
    a third outlet, wherein the second inlet is between and spaced from the first inlet and the third inlet, a second interface is between the second fluid and the third fluid, and the third inlet and the third outlet are operatively and fluidically connected to the micro channel.

5. The apparatus of claim 4, further comprising:
    a second pair of electrodes that apply a second electric field that controls a flow velocity of the third fluid along the micro channel.

6. The apparatus of claim 5, wherein the second electric field controls a location of the second interface across the width of the micro channel, the residence time of the first fluid in the micro channel, the residence time of the second fluid in the micro channel and a residence time of the third fluid in the micro channel.

7. The apparatus of claim 5, wherein the second pair of electrodes comprises a first electrode and a second electrode, the first electrode is in the third inlet and the second electrode is in the third outlet.

8. The apparatus of claim 4, further comprising:
    a fourth outlet operatively and fluidically connected to the micro channel.

9. The apparatus of claim 8, further comprising:
a second pair of electrodes that apply a second electric field that controls a flow velocity of the third fluid along the micro channel.

10. The apparatus of claim 9, wherein the second electric field controls a location of the second interface across the width of the micro channel, the residence time of the first fluid in the micro channel, the residence time of the second fluid in the micro channel and a residence time of the third fluid in the micro channel.

11. The apparatus of claim 9, wherein the second pair of electrodes comprises a first electrode and a second electrode, the first electrode is in the third inlet and the second electrode is in the fourth outlet.

12. The apparatus of claim 8, further comprising:
a fifth outlet operatively and fluidically connected to the micro channel.

13. The apparatus of claim 12, further comprising:
a second pair of electrodes that apply a second electric field that controls a flow velocity of the third fluid along the micro channel.

14. The apparatus of claim 13, wherein the second electric field controls a location of the second interface across the width of the micro channel, the residence time of the first fluid in the micro channel, the residence time of the second fluid in the micro channel and a residence time of the third fluid in the micro channel.

15. The apparatus of claim 13, wherein the second pair of electrodes comprises a first electrode and a second electrode, the first electrode is in the third inlet and the second electrode is in the fifth outlet.

16. The apparatus of claim 5, wherein the first electric field and the second electric field direct the second fluid to at least one of the first outlet, the second outlet and the third outlet.

17. The apparatus of claim 9, wherein the first electric field and the second electric field direct the second fluid to at least one of the first outlet, the second outlet, the third outlet and the fourth outlet.

18. The apparatus of claim 13, wherein the first electric field and the second electric field direct the second fluid to at least one of the first outlet, the second outlet, the third outlet, the fourth outlet and the fifth outlet.

19. The apparatus of claim 1, wherein the apparatus is at least one of an electrokinetic flow switch, a micromixer, a micro-flow cytometer, an interface position controller, and an in-channel fluidic lens.

20. The apparatus of claim 4, further comprising:
a fourth inlet for a fourth fluid, wherein the fourth inlet is operatively and fluidically connected to the micro channel.

21. The apparatus of claim 20, wherein the fourth inlet is between and spaced from the second inlet and the third inlet.

22. The apparatus of claim 20, further comprising:
top and bottom fourth inlets, wherein the top fourth inlet is between and spaced from the first inlet and the second inlet, and the bottom fourth inlet is between and spaced from the second inlet and the third inlet.

23. The apparatus of claim 22, wherein the fourth fluid is a protection fluid that separates the first fluid from the second and third fluids.

24. The apparatus of claim 22, wherein the fourth fluid comprises two sample fluids, and the second fluid is a protection fluid that separates the two sample fluids.

25. The apparatus of claim 5, wherein the first and second electric fields narrow a width of the second fluid in the micro channel, thereby focusing a flow of the second fluid in the micro channel.

26. The apparatus of claim 21, wherein the apparatus is a micro-mixer, and the first and second electric fields narrow a width of the second fluid in the micro channel and narrow a width of the fourth fluid in the micro channel, thereby controlling a diffusion path and a diffusion time in the micro channel.

27. The apparatus of claim 6, wherein the first electric field and the second electric field control the locations of the first interface and the second interface.

28. The apparatus of claim 1, further comprising:
a pair of additional electrodes located at opposite axial ends of the micro channel; and
a pair of further electrodes located at a top and a bottom of the micro channel, wherein the further electrodes control a curved shape of the first interface, and the additional electrodes control a focal length and a position of the curved shape.

29. A method for controlling fluid flow in a micro channel, wherein the micro channel is operatively and fluidically connected to a first inlet, a second inlet, a first outlet and a second outlet, the method comprising:
supplying a first fluid through the first inlet under pressurized flow to the micro channel;
supplying a second fluid through the second inlet under pressurized flow to the micro channel;
flowing the first fluid along the micro channel to the first outlet;
flowing the second fluid along the micro channel to the second outlet;
providing a first interface between the first fluid and the second fluid in the micro channel; and
applying a first electric field using a pair of electrodes to control a flow velocity of the first fluid along the micro channel, a location of the first interface across a width of the micro channel, and a residence time of the first and second fluids in the micro channel.

30. The method of claim 29, wherein the first electric field controls an electroosmotic force in the micro channel, and the electroosmotic force affects a flow of the first fluid in the micro channel.

31. The method of claim 29, wherein the first pair of electrodes comprises a first electrode and a second electrode, the first electrode is in the first inlet and the second electrode is in the first outlet.

32. The method of claim 29, wherein the micro channel is operatively and fluidically connected to a third inlet and a third outlet, and the second inlet is between and spaced from the first inlet and the third inlet, further comprising:
supplying a third fluid through the third inlet to the micro channel;
flowing the third fluid along the micro channel to the third outlet; and
providing a second interface between the second fluid and the third fluid in the micro channel.

33. The method of claim 32, further comprising:
applying a second electric field using a second pair of electrodes to control a flow velocity of the third fluid along the micro channel.

34. The method of claim 33, wherein the second electric field controls a location of the second interface across the width of the micro channel, the residence time of the first fluid in the micro channel, the residence time of the second fluid in the micro channel and a residence time of the third fluid in the micro channel.

35. The method of claim 34, wherein the second pair of electrodes comprises a first electrode and a second electrode, the first electrode is in the third inlet and the second electrode is in the third outlet.

36. The method of claim 32, wherein the micro channel is operatively and fluidically connected to a fourth outlet, further comprising:
applying a second electric field using a second pair of electrodes to control a flow velocity of the third fluid along the micro channel.

37. The method of claim 36, wherein the second electric field controls a location of the second interface across the width of the micro channel, the residence time of the first fluid in the micro channel, the residence time of the second fluid in the micro channel and a residence time of the third fluid in the micro channel.

38. The method of claim 36, wherein the second pair of electrodes comprises a first electrode and a second electrode, the first electrode is in the third inlet and the second electrode is in the fourth outlet.

39. The method of claim 36, wherein the micro channel is operatively and fluidically connected to a fifth outlet, further comprising:
applying a second electric field using a second pair of electrodes to control a flow velocity of the third fluid along the micro channel.

40. The method of claim 39, wherein the second electric field controls a location of the second interface across the width of the micro channel, the residence time of the first fluid in the micro channel, the residence time of the second fluid in the micro channel and a residence time of the third fluid in the micro channel.

41. The method of claim 39, wherein the second pair of electrodes comprises a first electrode and a second electrode, the first electrode is in the third inlet and the second electrode is in the fifth outlet.

42. The method of claim 33, wherein the first electric field and the second electric field direct the second fluid to at least one of the first outlet, the second outlet and the third outlet.

43. The method of claim 36, wherein the first electric field and the second electric field direct the second fluid to at least one of the first outlet, the second outlet, the third outlet and the fourth outlet.

44. The method of claim 39, wherein the first electric field and the second electric field direct the second fluid to at least one of the first outlet, the second outlet, the third outlet, the fourth outlet and the fifth outlet.

45. The method of claim 29, wherein the method is used for at least one of an electrokinetic flow switch, a micromixer, a micro-flow cytometer, an interface position controller, and an in-channel fluidic lens.

46. The method of claim 32, wherein the micro channel is operatively and fluidically connected to a fourth inlet, further comprising:
supplying a fourth fluid through the fourth inlet to the micro channel.

47. The method of claim 46, wherein the fourth inlet is between and spaced from the second inlet and the third inlet.

48. The method of claim 46, wherein the micro channel is operatively and fluidically connected to top and bottom fourth inlets, the top fourth inlet is between and spaced from the first inlet and the second inlet, and the bottom fourth inlet is between and spaced from the second inlet and the third inlet.

49. The method of claim 48, wherein the fourth fluid is a protection fluid that separates the first fluid from the second and third fluids.

50. The method of claim 48, wherein the fourth fluid comprises two sample fluids, and the second fluid is a protection fluid that separates the two sample fluids.

51. The method of claim 34, wherein the first and second electric fields narrow a width of the second fluid in the micro channel, thereby focusing a flow of the second fluid in the micro channel.

52. The method of claim 47, wherein the method is used for mixing at a micro scale, and the first and second electric fields narrow a width of the second fluid in the micro channel and narrow a width of the fourth fluid in the micro channel, thereby controlling a diffusion path and a diffusion time in the micro channel.

53. The method of claim 33, wherein the first electric field and the second electric field control the locations of the first interface and the second interface.

54. The method of claim 29, wherein a pair of additional electrodes are located at opposite axial ends of the micro channel, a pair of further electrodes are located at a top and a bottom of the micro channel, the further electrodes control a curved shape of the first interface, and the additional electrodes control a focal length and a position of the curved shape.

55. An apparatus for controlling fluid flow in a micro channel, the apparatus comprising:
a first inlet for a first fluid;
a second inlet for a second fluid;
a first outlet;
a second outlet;
electrodes; and
the micro channel, wherein the micro channel is operatively and fluidically connected to the first inlet, the second inlet, the first outlet and the second outlet, the micro channel receives the first fluid and the second fluid under pressurized flow, an interface is between the first fluid and the second fluid in the micro channel, and the electrodes apply an electric field that controls a flow velocity of the first fluid along the micro channel, a residence time of the first and second fluids in the micro channel, a location of the interface across a width of the micro channel, a curved shape of the interface, and a focal length and a position of the curved shape.

56. A method for controlling fluid flow in a micro channel, wherein the micro channel is operatively and fluidically connected to a first inlet, a second inlet, a first outlet and a second outlet, the method comprising:
supplying a first fluid through the first inlet under pressurized flow to the micro channel;
supplying a second fluid through the second inlet under pressurized flow to the micro channel;
flowing the first fluid along the micro channel to the first outlet;
flowing the second fluid along the micro channel to the second outlet;
providing an interface between the first fluid and the second fluid in the micro channel;
controlling a flow velocity of the first fluid along the micro channel using an electric field applied by the electrodes;
controlling a residence time of the first fluid in the micro channel using an electric field applied by the electrodes;
controlling a residence time of the second fluid in the micro channel using an electric field applied by the electrodes;
controlling a location of the interface across a width of the micro channel using an electric field applied by the electrodes;
controlling a curved shape of the interface using an electric field applied by the electrodes; and controlling a focal length and a position of the curved shape using an electric field applied by the electrodes.

57. An apparatus for controlling fluid flow in a micro channel, the apparatus comprising:
a first inlet for a first fluid;
a second inlet for a second fluid;
a first outlet;
a second outlet;
electrodes; and
the micro channel, wherein the micro channel is operatively and fluidically connected to the first inlet, the second inlet, the first outlet and the second outlet, the micro channel receives the first fluid and the second fluid under pressurized flow from the first inlet and the second inlet, respectively, an interface is between the first fluid and the second fluid in the micro channel, and the electrodes apply an electric field that controls a flow velocity of the first fluid in the micro channel, a form and a position of the interface in the micro channel, a location of the interface across a width of the micro channel, a residence time of the first fluid in the micro channel and a residence time of the second fluid in the micro channel.

58. The apparatus of claim 57, wherein the first fluid is a control fluid and the second fluid is a sample fluid.

59. The apparatus of claim 58, wherein the first fluid is aqueous sodium chloride.

60. The apparatus of claim 58, wherein the second fluid is biological fluid.

61. The apparatus of claim 57, wherein the electric field controls a viscosity of the first fluid in the micro channel.

62. The apparatus of claim 57, wherein the electric field controls a holdup of the first fluid in the micro channel, and the holdup is a ratio a cross-sectional area occupied by the first fluid along a width of the micro channel to a cross-sectional area of the micro channel along the width of the micro channel.

63. The apparatus of claim 57, wherein the electric field controls an electroosmotic force in the micro channel, and the electroosmotic force affects a flow of the first fluid in the micro channel.

64. The apparatus of claim 57, wherein the electric field controls a focal length and a position of a curved shape of the interface in the micro channel.

65. The apparatus of claim 57, wherein the residence times of the first and second fluids are the same.

66. The apparatus of claim 57, wherein the apparatus is a diffusion-based analysis device.

* * * * *